US012357920B2

(12) United States Patent
Vamos et al.

(10) Patent No.: US 12,357,920 B2
(45) Date of Patent: Jul. 15, 2025

(54) MULTI-SEGMENT MOVABLE RAILING ASSEMBLY

(71) Applicant: Universal City Studios LLC, Universal City, CA (US)

(72) Inventors: Christopher Michael Vamos, Orlando, FL (US); Jimmie Bryan Andrews, Orlando, FL (US); David Gerard Majdali, Orlando, FL (US); Nathan John Morris, Riverdale, UT (US); Kathryn Wisdom, Ogden, UT (US); Roger Allen Sharp, Hyrum, UT (US)

(73) Assignee: Universal City Studios LLC, Universal City, CA (US)

(*) Notice: Subject to any disclaimer, the term of this patent is extended or adjusted under 35 U.S.C. 154(b) by 969 days.

(21) Appl. No.: 17/479,366

(22) Filed: Sep. 20, 2021

(65) Prior Publication Data

US 2022/0134242 A1 May 5, 2022

Related U.S. Application Data

(60) Provisional application No. 63/106,944, filed on Oct. 29, 2020.

(51) Int. Cl.
*A63G 4/00* (2006.01)
*A63G 7/00* (2006.01)
(Continued)

(52) U.S. Cl.
CPC ................. *A63G 4/00* (2013.01); *A63G 7/00* (2013.01); *A63G 21/20* (2013.01); *A63G 31/02* (2013.01);
(Continued)

(58) Field of Classification Search
CPC . A63G 4/00; A63G 7/00; A63G 21/20; A63G 31/02; E04F 11/18; E04F 11/1865; E06B 11/045; E06B 11/026; E06B 11/022
(Continued)

(56) References Cited

U.S. PATENT DOCUMENTS 1,480,678 A * 1/1924 Feucht ..................... B61G 5/02
213/46 R
2,221,414 A * 11/1940 Schmidt ................... A63G 7/00
104/53
(Continued)

FOREIGN PATENT DOCUMENTS

CN 2563284 Y 7/2003
CN 111173434 A 5/2020
(Continued)

OTHER PUBLICATIONS

PCT/US2021/055915 International Search Report and Written Opinion mailed Feb. 11, 2022.

*Primary Examiner* — S. Joseph Morano
*Assistant Examiner* — James William Jones
(74) *Attorney, Agent, or Firm* — Fletcher Yoder, P.C.

(57) ABSTRACT

A movable railing assembly includes a first railing segment having a first bogie and a first barrier coupled to the first bogie. The first bogie is configured to engage a track positioned below the first barrier and to facilitate movement of the first railing segment along the track, and the first
(Continued)

barrier is configured to block access across the first railing segment. The movable railing assembly also includes a second railing segment having a second bogie and a second barrier coupled to the second bogie. The second bogie is configured to engage the track and to facilitate movement of the second railing segment along the track, and the second barrier is configured to block access across the second railing segment. Furthermore, the movable railing assembly includes a connector coupling the first railing segment to the second railing segment.

19 Claims, 6 Drawing Sheets

(51) Int. Cl.

| | |
|---|---|
| ***A63G 21/20*** | (2006.01) |
| ***A63G 31/02*** | (2006.01) |
| ***E04F 11/18*** | (2006.01) |
| ***E06B 11/02*** | (2006.01) |
| ***E06B 11/04*** | (2006.01) |

(52) U.S. Cl.
CPC ............ *E04F 11/18* (2013.01); *E06B 11/022* (2013.01); *E06B 11/026* (2013.01); *E06B 11/045* (2013.01); *E04F 11/1865* (2013.01)

(58) Field of Classification Search
USPC ............................................................ 104/28
See application file for complete search history.

(56) References Cited

U.S. PATENT DOCUMENTS

| | | | | |
|---|---|---|---|---|
| 3,727,558 | A * | 4/1973 | Winkle | B66B 29/08 472/2 |
| 5,176,082 | A * | 1/1993 | Chun | B61B 1/02 105/341.5 |
| 5,845,580 | A * | 12/1998 | Muller | B61B 1/02 104/31 |
| 6,751,907 | B1 * | 6/2004 | De Gasperis | E06B 11/045 49/404 |
| 7,168,881 | B2 | 1/2007 | Hartlauer | |
| 10,065,123 | B2 * | 9/2018 | Zamperla | A63G 7/00 |
| 10,315,120 | B2 * | 6/2019 | McVeen | A63G 21/12 |
| 10,835,832 | B2 | 11/2020 | Fontiveros Penso et al. | |
| 2006/0072966 | A1 * | 4/2006 | Hartlauer | E05F 15/655 404/6 |
| 2016/0123078 | A1 * | 5/2016 | Bouthillier | E06B 11/026 248/188.4 |
| 2019/0024454 | A1 * | 1/2019 | Maddamma | E05F 15/56 |
| 2019/0368142 | A1 * | 12/2019 | Philpott | E01F 13/048 |
| 2020/0307650 | A1 | 10/2020 | Fontiveros Penso et al. | |
| 2020/0307651 | A1 | 10/2020 | Bertoncello et al. | |

FOREIGN PATENT DOCUMENTS

| | | | |
|---|---|---|---|
| EP | 1619308 | | 1/2006 |
| JP | S5138362 | U | 3/1976 |
| JP | H08326452 | A * | 12/1996 |
| JP | 2013071561 | | 4/2013 |
| JP | 2013071561 | A * | 4/2013 |
| KR | 200384882 | Y1 * | 5/2005 |
| KR | 20100009198 | A * | 1/2010 |

* cited by examiner

FIG. 6
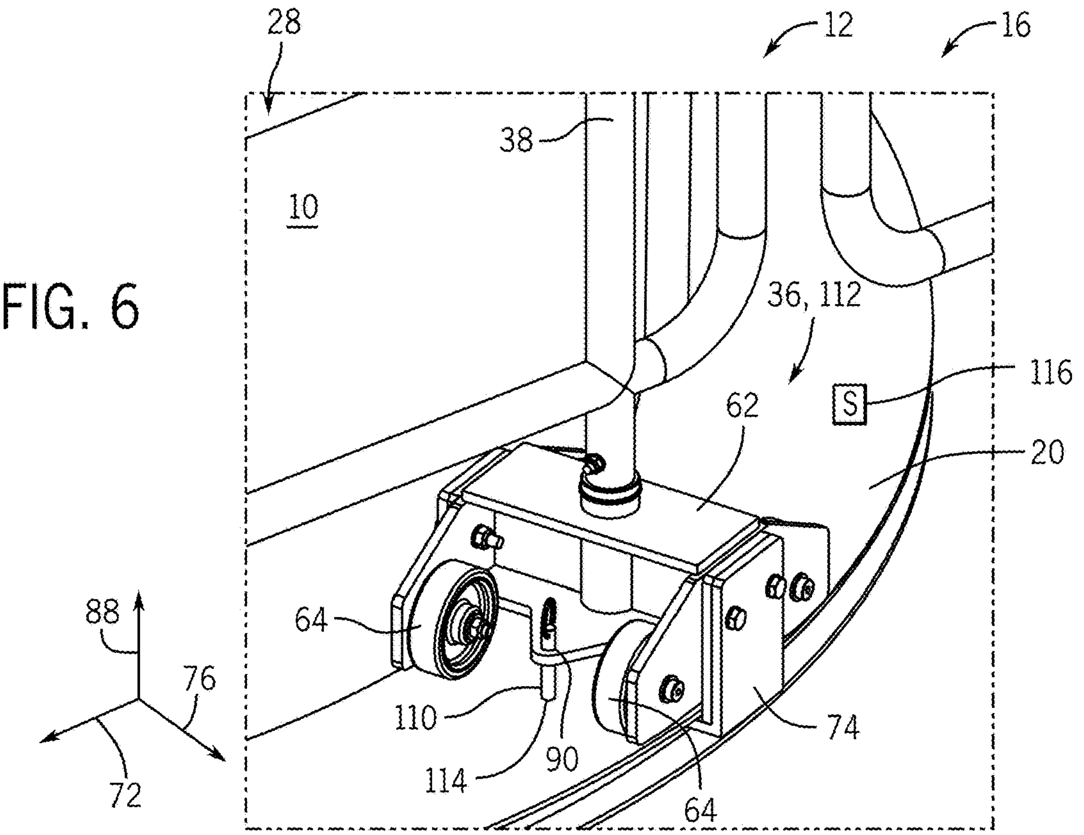
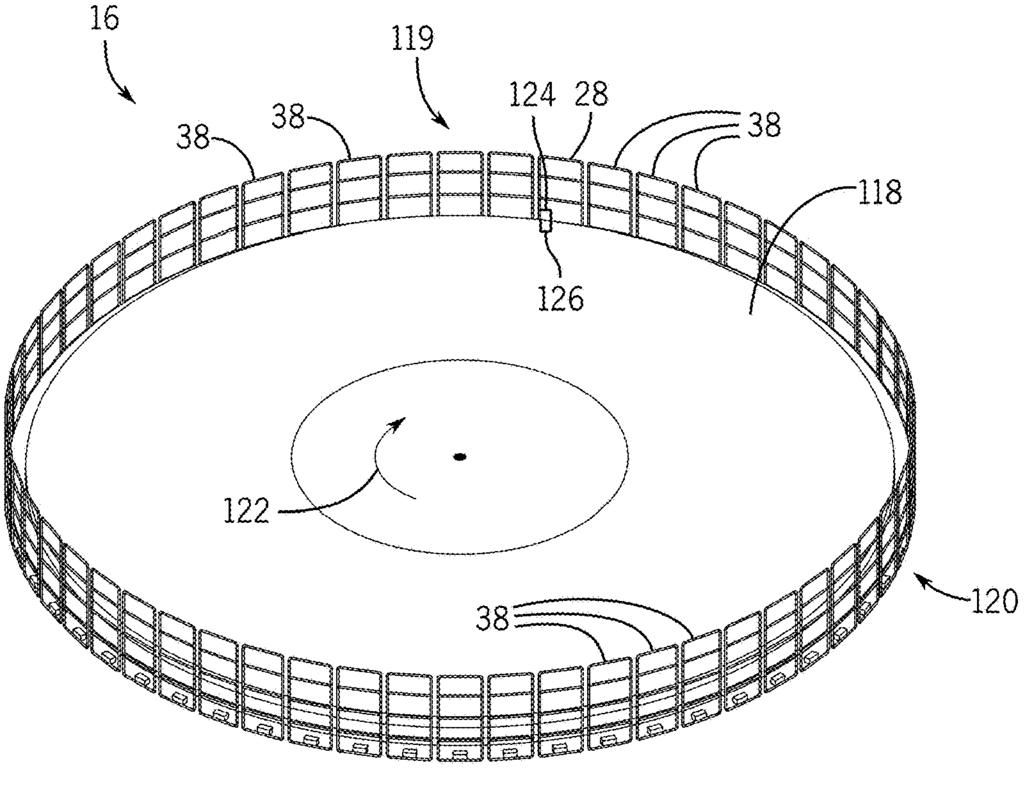
FIG. 7

MULTI-SEGMENT MOVABLE RAILING ASSEMBLY

CROSS-REFERENCE TO RELATED APPLICATION

This application claims priority from and the benefit of U.S. Provisional Application Ser. No. 63/106,944, entitled "MULTI-SEGMENT MOVABLE RAILING ASSEMBLY," filed Oct. 29, 2020, which is hereby incorporated by reference in its entirety.

BACKGROUND

The present disclosure relates generally to a multi-segment movable railing assembly.

Certain amusement park rides include a movable vehicle suspended from a track. One or more platforms may be positioned beneath the vehicle along certain portion(s) of the ride to facilitate passenger egress in the event that movement of the vehicle is unexpectedly terminated. For example, if the vehicle unexpectedly stops moving while the vehicle is over a platform, an operator may move to the platform to assist with passenger egress. However, if the vehicle is positioned proximate to an edge of the platform, the operator may erect a barrier at the edge before enabling the passengers to exit the vehicle. Because the operator is working proximate to the edge of the platform, the operator may attach a safety line to the platform before erecting the barrier. Unfortunately, the process of attaching the safety line and erecting the barrier is significantly time-consuming, thereby delaying passenger egress from the vehicle.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the claimed subject matter. Indeed, the claimed subject matter may encompass a variety of forms that may be similar to or different from the embodiments set forth below.

In certain embodiments, a movable railing assembly includes a first railing segment having at least one first bogie and a first barrier coupled to the at least one first bogie. The at least one first bogie is configured to engage a track positioned below the first barrier and to facilitate movement of the first railing segment along the track, and the first barrier is configured to block access across the first railing segment. The movable railing assembly also includes a second railing segment having at least one second bogie and a second barrier coupled to the at least one second bogie. The at least one second bogie is configured to engage the track and to facilitate movement of the second railing segment along the track, and the second barrier is configured to block access across the second railing segment. Furthermore, the movable railing assembly includes a connector coupling the first railing segment to the second railing segment. The connector is configured to drive movement of the second railing segment along the track in response to movement of the first railing segment along the track. In addition, the connector, the first and second railing segments, or a combination thereof, is configured to substantially maintain a spacing between the first and second railing segments as the first and second railing segments move along the track.

DRAWINGS

These and other features, aspects, and advantages of the present disclosure will become better understood when the following detailed description is read with reference to the accompanying drawings in which like characters represent like parts throughout the drawings, wherein:

FIG. 6 is a perspective view of a bogie and the track, in which movement of the bogie along the track is blocked by a pin engaged with the bogie and the track; and FIG. 7 is a perspective view of an embodiment of a rotating platform and an embodiment of a movable railing assembly configured to selectively extend around a periphery of the rotating platform.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
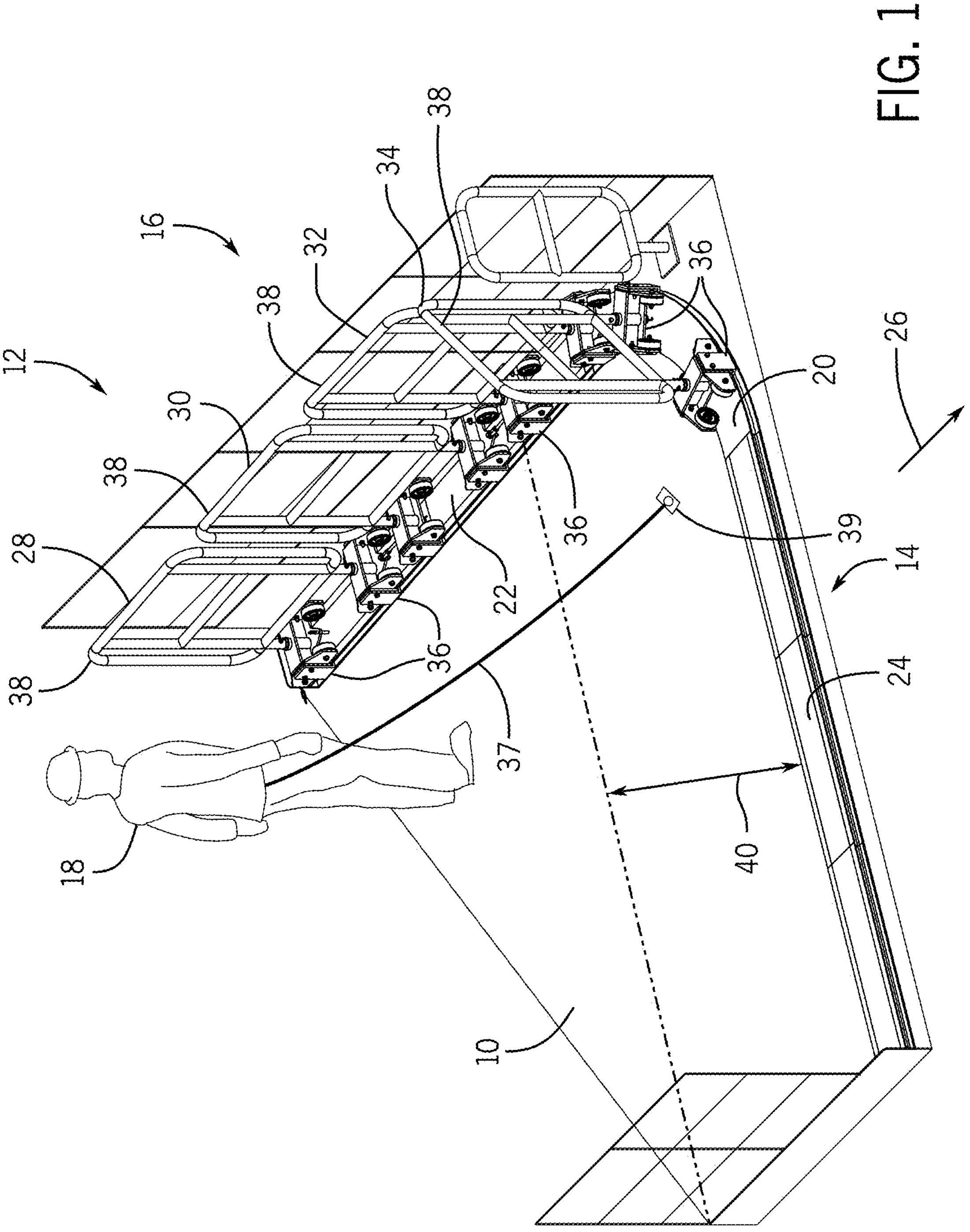
FIG. 1 is a perspective view of an embodiment of a platform and an embodiment of a movable railing assembly configured to block an end of the platform, in which a movable railing of the movable railing assembly is in an open position.

FIG. 1 is a perspective view of an embodiment of a platform 10 and an embodiment of a movable railing assembly 12 configured to selectively block an end 14 of the platform 10, in which a movable railing 16 of the movable railing assembly 12 is in an open position. In the illustrated embodiment, the platform 10 is part of an amusement park ride. The amusement park ride may include a vehicle suspended from a track, and the platform 10 may be positioned beneath the vehicle along a portion of the vehicle path through the ride. The platform 10 is configured to facilitate egress of passengers from the vehicle in the event that movement of the vehicle is unexpectedly terminated while the vehicle is positioned above the platform. In addition, the movable railing 16 of the movable railing assembly 12 is configured to be moved from the illustrated open position to a closed position prior to egress of the passengers from the vehicle to block movement of the passengers beyond the end 14 (e.g., edge) of the platform 10.

While the movable railing 16 is in the illustrated open position, the vehicle may traverse the end 14 of the platform 10, thereby enabling movement of the vehicle through the ride. If the vehicle unexpectedly stops proximate to the end 14 of the platform 10, an operator 18 may move the movable railing 16 from the illustrated open position to the closed position, thereby blocking movement of the passengers beyond the end 14 of the platform 10. The operator may then enable the passengers to exit the vehicle (e.g., by disengaging a passenger restraint system). As the operator 18 moves the movable railing 16 along a curved track 20 of the movable railing assembly, the operator 18 remains a significant distance from the end 14 of the platform 10, as discussed in detail below.

In the illustrated embodiment, the curved track 20 of the movable railing assembly 12 has a first portion 22 and a second portion 24. The first portion 22 of the curved track 20 is configured to be oriented substantially parallel to a direction of travel 26 of the vehicle through the ride. In addition, the second portion 24 of the curved track 20 is configured to be oriented substantially perpendicular to the direction of travel 26 of the vehicle through the ride. As used herein, "substantially parallel" refers to a difference in orientation of less than 45 degrees, less than 30 degrees, less than 15 degrees, less than 10 degrees, less than 5 degrees, or less than 2 degrees. Furthermore, as used herein, "substantially perpendicular" refers to a difference in orientation of greater than 45 degrees, greater than 60 degrees, greater than 75 degrees, greater than 80 degrees, greater than 85 degrees, or greater than 88 degrees. As illustrated, the movable railing 16 is positioned at the first portion 22 of the curved track 20. Accordingly, the movable railing 16 is in an open position (e.g., first position) that facilitates movement of the vehicle through the ride. The movable railing 16 is configured to move along the curved track 20 from the open position to a closed position (e.g., second portion), in which the movable railing 16 is positioned at the second portion 24 of the curved track. While the movable railing 16 is in the closed position, movement of the passengers beyond the end 14 of the platform 10 is blocked.

In the illustrated embodiment, the movable railing 16 includes a first railing segment 28, a second railing segment 30, a third railing segment 32, and a fourth railing segment 34. While the movable railing 16 includes four railing segments in the illustrated embodiment, in other embodiments, the movable railing may include more or fewer railing segments (e.g., 2, 3, 4, 5, 6, 7, 8, 9, 10, 11, 12, or more). Furthermore, each railing segment includes one or more bogies 36 and a barrier 38 coupled to the bogie(s). Each bogie 36 is configured to engage the curved track 20 to facilitate movement of the respective railing segment along the curved track 20. In addition, each barrier 38 is positioned above the curved track 20, and each barrier 38 is configured to block access (e.g., movement of a person, movement of equipment, etc.) across the respective railing segment while the movable railing 16 is in the closed position. In the illustrated embodiment, each barrier 38 is formed by multiple rods coupled to one another (e.g., by welded connections, etc.). However, in other embodiments, at least one barrier may be formed by any other suitable structure(s) configured to block access across the respective railing segment, such as cable(s), rod(s), plate(s), pole(s), other suitable structure(s), or a combination thereof. Furthermore, in the illustrated embodiment, each railing segment includes two bogies positioned on opposite longitudinal ends of the respective railing segment. However, in other embodiments, at least one railing segment may include more or fewer bogies (e.g., 1, 2, 3, 4, 5, 6, or more) positioned at any suitable location along the railing segment.

In the illustrated embodiment, a first connector couples the first railing segment 28 to the second railing segment 30, a second connector couples the second railing segment 30 to the third railing segment 32, and a third connector couples the third railing segment 32 to the fourth railing segment 34. The first connector is configured to drive movement of the second railing segment 30 along the curved track 20 in response to movement of the first railing segment 28 along the curved track 20. Furthermore, the second connector is configured to drive movement of the third railing segment 32 along the curved track 20 in response to movement of the second railing segment 30 along the curved track 20. In addition, the third connector is configured to drive movement of the fourth railing segment 34 along the curved track 20 in response to movement of the third railing segment 32 along the curved track 20.

Because the railing segments are coupled to one another by respective connectors, the movable railing 16 may be moved from the illustrated open position to the closed position via application of force to the first railing segment 28 along the direction of travel 26 of the vehicle through the ride. For example, the operator 18 may grab/grasp the first railing segment 28 and walk toward the end 14 of the platform 10, thereby driving the movable railing 16 along the track 20. As illustrated, the operator 18 is positioned greater than a threshold distance 40 from the end 14 of the platform 10 while the movable railing 16 is in the open position and the operator 18 initially grabs/grasps the first railing segment 28. The threshold distance 40 may be selected based on applicable safety standards (e.g., selected by the manufacturer of the ride, selected by the operator of the ride, selected by a government entity, etc.). For example, the threshold distance may be 10 feet (e.g., 3 meters), 8 feet (e.g., 2.4 meters), 6 feet (e.g., 1.8 meters), 4 feet (1.2 meters), or any other suitable distance. As discussed in detail below, as the operator walks toward the end 14 of the platform 10, the operator remains separated from the unprotected end of the platform (e.g., end of the platform that is not blocked by the movable railing) by more than the threshold distance, thereby facilitating compliance with the applicable safety standards.

In certain embodiments, the movable railing assembly 12 includes a pin that may extend through an aperture within a bogie 36 (e.g., the bogie positioned at an end of the movable railing 16 farthest from the end 14 of the platform 10 while the movable railing 16 is in the open position). The pin is configured to selectively engage an aperture in the track 20 while the movable railing 16 is in the illustrated open position to block movement of the movable railing 16 from the open position, thereby substantially reducing or eliminating the possibility of unintentional movement of the movable railing 16 away from the open position (e.g., toward the closed position). In addition, the pin is configured to selectively engage an aperture in the track 20 while the movable railing 16 is in the closed position to block movement of the movable railing 16 from the closed position, thereby substantially reducing or eliminating the possibility of unintentional movement of the movable railing 16 away from the closed position (e.g., toward the open position). Furthermore, in certain embodiments, the movable railing assembly 12 includes a sensor configured to output a signal indicative of a position of the movable railing, thereby enabling the operator to determine the position of the movable railing while positioned remote from the movable railing.

In the illustrated embodiment, the track 20 is curved and includes the first position 22 and the second portion 24. However, in other embodiments, the track may have any other suitable shape (e.g., to selectively block an end of a platform). For example, the track may be substantially straight (e.g., to enable the movable railing to move in a single direction from the open position to the closed position). By way of further example, the track may have three portions (e.g., separated by arcuate sections), and the movable railing may be configured to move between a first position at the first portion of the track, a second position at the second portion of the track, and a third position at the third portion of the track. Furthermore, the track may be circular, elliptical, polygonal, or any other suitable shape or combination of shapes.

In the illustrated embodiment, the movable railing assembly 12 includes an anchor point 39 positioned proximate to the track 20. The anchor point 39 is configured to couple to a line (e.g., safety line) extending from the operator 18. For example, the operator 18 may wear a harness, and a line (e.g., safety line) 37 may extend from the harness to the anchor point 39. While the movable railing assembly includes an anchor point in the illustrated embodiment, in other embodiments, the anchor point may be omitted.

Figure 2:
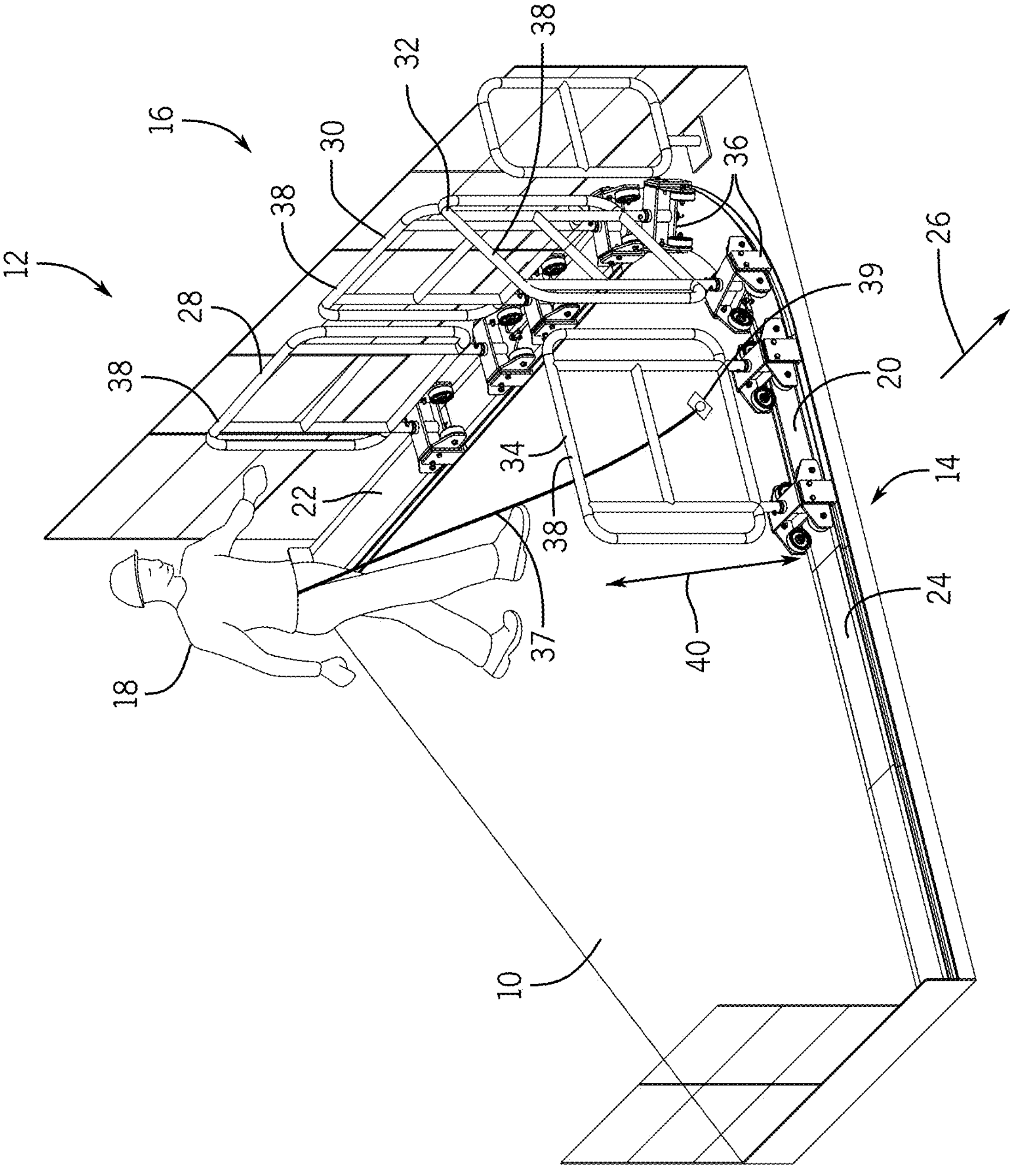
FIG. 2 is a perspective view of the platform and the movable railing assembly of FIG. 1, in which the movable railing is in a partially closed position.

FIG. 2 is a perspective view of the platform 10 and the movable railing assembly 12 of FIG. 1, in which the movable railing 16 is in a partially closed position. As illustrated, the operator 18 maintains the grasp on the first railing segment 28 as the operator 18 moves the movable railing 16 from the open position to the closed position. With the movable railing 16 in the partially closed position, the operator 18 is positioned closer to the end 14 of the platform 10, as compared to the position of the operator 18 while the movable railing 16 is in the open position. However, the portion of the end 14 of the platform 10 positioned closest to the operator 18 is blocked by the movable railing 16. Accordingly, the operator 18 remains positioned greater than the threshold distance 40 from the unprotected end of the platform, thereby facilitating compliance with the applicable safety standards.

Figure 3:
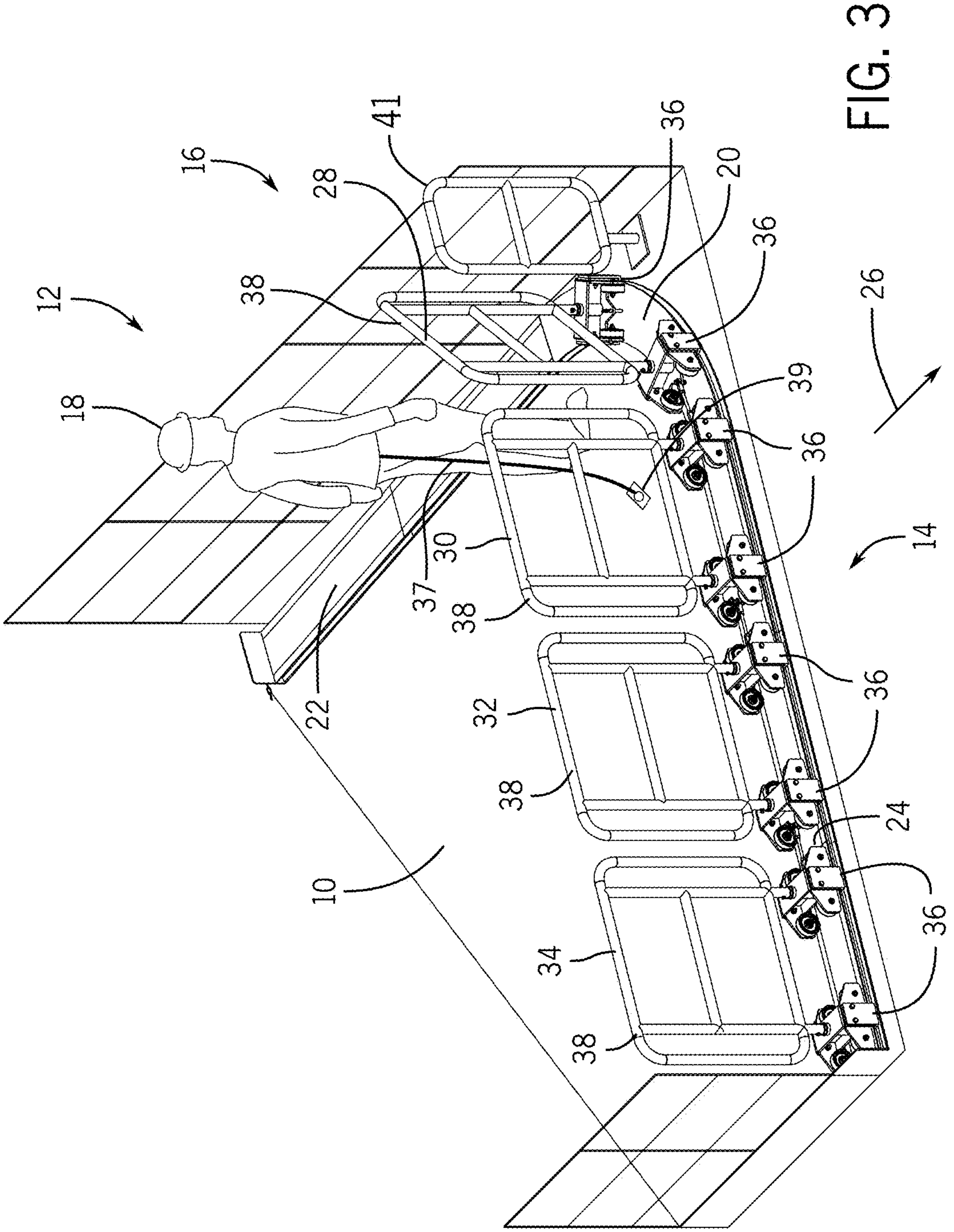
FIG. 3 is a perspective view of the platform and the movable railing assembly of FIG. 1, in which the movable railing is in a closed position.

FIG. 3 is a perspective view of the platform 10 and the movable railing assembly 12 of FIG. 1, in which the movable railing 16 is in the closed position. As illustrated, with the movable railing 16 in the illustrated closed position, movement of the operator 18 and the passengers beyond the end 14 of the platform 10 is blocked by the movable railing 16. As previously discussed, in certain embodiments, a pin may extend through an aperture within a bogie 36 (e.g., the bogie positioned at an end of the movable railing 16 farthest from the end 14 of the platform 10 while the movable railing 16 is in the open position). In such embodiments, the pin may be engaged with an aperture in the track 20 while the movable railing 16 is in the illustrated closed position to block movement of the movable railing 16 from the closed position, thereby substantially reducing or eliminated the possibility of unintentional movement of the movable railing 16 away from the closed position (e.g., toward the open position).

To move the movable railing 16 from the illustrated closed position to the open position, the operator may grab/grasp the first railing segment 28 and walk toward the initial position, as shown in FIG. 1. As described above with regard to movement of the movable railing from the open position to the closed position, the operator remains separated from the unprotected end of the platform by more than the threshold distance, thereby facilitating compliance with the applicable safety standards. Furthermore, in embodiments including the pin, the operator may disengage the pin from the respective aperture in the track before moving the movable railing from the closed position to the open position, and then the operator may reengage the pin with the respective aperture in the track in response to the movable railing reaching the open position, thereby blocking movement of the movable railing from the open position.

While the movable railing 16 is configured to be driven between the open and closed positions by the operator 18 in the illustrated embodiment, in other embodiments, the movable railing may be driven to move along the track via a motive device/system. For example, in certain embodiments, a motor (e.g., electric motor, hydraulic motor, pneumatic motor, etc.) may be configured to drive the movable railing to move along the track. In certain embodiments, the motor may be coupled to a winch system including a cable coupled to the movable railing. In such embodiments, the motor may drive the cable to retract, thereby driving the movable railing to move along the track (e.g., from the open position to the closed position, or from the closed position to the open position). A second motor and winch system may be used to move the movable railing in the opposite direction. Furthermore, in certain embodiments, a motor may be coupled to the movable railing and configured to drive one or more of the wheels of one or more bogies to rotate, thereby driving the movable railing to move along the track. In other embodiments, other and/or additional system(s)/device(s) may be used to drive movement of the movable railing (e.g., selective coupling to a rotating platform, a hydraulic cylinder, a linear actuator, a chain drive, etc.).

In the illustrated embodiment, the movable railing assembly 12 includes a fixed railing segment 41 positioned adjacent to the first railing segment 28 while the movable railing 16 is in the illustrated closed position. The fixed railing segment 41 is configured to block a portion of the end 14 that is not blocked by the movable railing 16. The spacing between the fixed railing segment 41 and the movable railing 16 may be selected to substantially block movement of the operator 18 or the passengers beyond the movable railing/fixed railing segment. While the movable railing assembly includes a single fixed railing segment in the illustrated embodiment, in other embodiments, the movable railing assembly may include more or fewer fixed railing segments (e.g., 0, 1, 2, 3, 4, 5, 6, or more). For example, one fixed railing segment may be positioned at an opposite end of the movable railing from the illustrated fixed railing segment (e.g., while the movable railing is in the closed position). In certain embodiments, a fixed railing segment may include an extension configured to engage a cutout in the barrier of the adjacent movable railing segment, thereby forming an overlapping barrier arrangement (e.g., in which the fixed railing segment and the barrier of the movable railing segment overlap along the direction of travel of the movable railing) while the movable railing is in the closed position. Furthermore, in certain embodiments, a fixed railing segment may include a cutout configured to receive an extension of the barrier of the adjacent movable railing segment, thereby forming an overlapping barrier arrangement (e.g., in which the fixed railing segment and the barrier of the movable railing segment overlap along the direction of travel of the movable barrier) while the movable railing is in the closed position.

Figure 4:
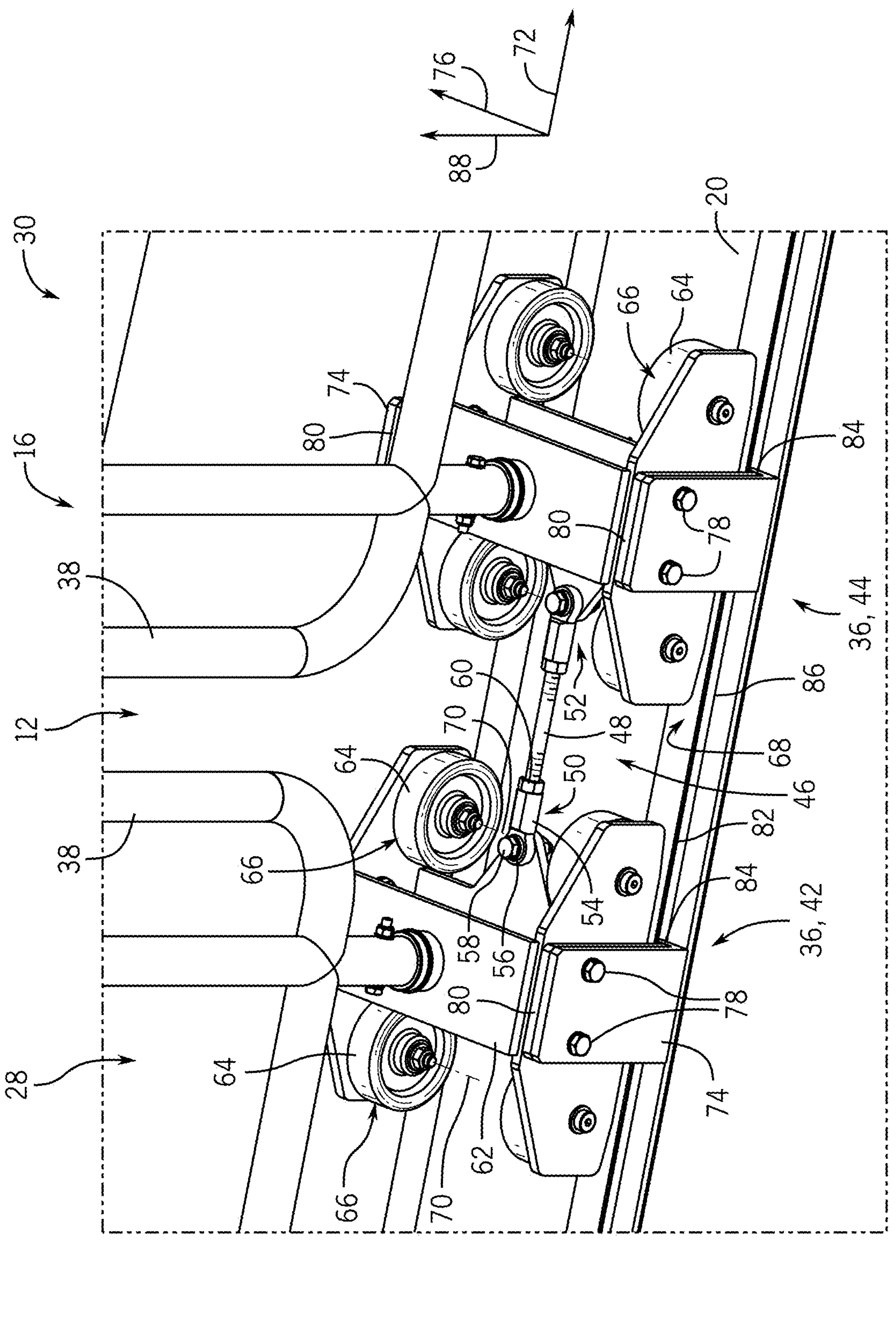
FIG. 4 is a perspective view of bogies engaged with a track of the movable railing assembly of FIG. 1.

FIG. 4 is a perspective view of bogies 36 engaged with the track 20 of the movable railing assembly 12 of FIG. 1. As illustrated, one first bogie 42 of the first railing segment 28 is coupled to one second bogie 44 of the second railing segment 30 by a connector 46. The connector 46 is configured to drive movement of the second railing segment 30 along the track 20 in response to movement of the first railing segment 28 along the track 20. For example, as the operator moves the first railing segment 28 from the open position toward the closed position, the connector 46 drives the second railing segment 30 toward the closed position. In addition, as the operator moves the first railing segment 28 from the closed position toward the open position, the connector 46 drives the second railing segment 30 toward the open position. Similarly, a second connector couples another second bogie of the second railing segment to a third bogie of the third railing segment, and a third connector couples a third bogie of the third railing segment to a fourth bogie of the fourth railing segment. The second connector is configured to drive movement of the third railing segment along the track in response to movement of the second railing segment along the track, and the third connector is configured to drive movement of the fourth railing segment along the track in response to movement of the third railing segment along the track. Accordingly, movement of the first railing segment along the track drives the other railing segments to move along the track.

In the illustrated embodiment, the connector 46 includes a rod 48 pivotally coupled to the first bogie 42 and to the second bogie 44. The rod 48 is substantially rigid. Accordingly, the rod 48 is configured to substantially maintain the spacing between the first bogie 42 and the second bogie 44 as the movable railing 16 moves along the track 20, thereby substantially maintaining the spacing between the first and second railing segments as the movable railing moves along the track. In the illustrated embodiment, the rod 48 is pivotally coupled to the first bogie 42 by a first connection assembly 50, and the rod 48 is pivotally coupled to the second bogie 44 by a second connection assembly 52. Each connection assembly includes a mount 54, a bearing 56, and a fastener 58, and each mount 54 is coupled to a respective end of the rod 48. For example, threads may be formed on the outer surface of each end of the rod 48, and a cavity within each mount 54 may have corresponding threads. The threads of the rod 48 may be engaged with the threads of the mount 54 via rotation of the rod 48 and/or the mount 54 to couple the mount 54 to the rod 48. Before the threads of the rod 48 are engaged with the threads of the mount 54, a nut 60 may be engaged with the threads of the rod 48. As such, after the threads of the rod 48 are engaged with the threads of the mount 54, the nut 60 may be rotated to drive the nut 60 against the mount 54, thereby substantially reducing or eliminating the possibility of the rod disengaging the mount in response to rotation of the rod.

In the illustrated embodiment, each mount 54 has an aperture, and a respective bearing 56 is disposed within the aperture of the mount 54. In addition, each bearing 56 includes an aperture, and a respective fastener 58 extends through the aperture of the bearing 56. Furthermore, a body 62 of each bogie 36 includes an aperture, and the respective fastener 58 extends through the aperture in the body 62 of the bogie 36. The fasteners 58 are configured to couple the respective mounts 54 to the bodies 62 of the bogies 36, and the bearings 56 are configured to facilitate rotation of the mounts 54 about the fasteners 58, thereby facilitating rotation of the rod 48 relative to each bogie 36. In certain embodiments, each fastener 58 is a bolt having a head and a threaded end. The threaded end is configured to engage a threaded nut to secure the fastener to the body of the bogie and to the mount. However, in other embodiments, another suitable fastener may be used to pivotally couple the mount to the body of the bogie, such as a pin or a rivet. Furthermore, while a bearing 56 is disposed between the fastener 58 and the mount 54 in the illustrated embodiment, in other embodiments, the bearing may be omitted and/or a bushing may be disposed between the fastener and the mount. In addition, while mounts are used to couple the rod to the bodies of the bogies in the illustrated embodiment, in other embodiments, at least one end of the rod may include an aperture, and a fastener/pin may extend through the aperture of the rod to couple the rod to the respective bogie body.

While the connector includes a substantially rigid rod in the illustrated embodiment, in other embodiments, at least one connector of the movable railing assembly may include another suitable device to drive movement of one railing segment along the track in response to movement of another railing segment along the track. For example, in certain embodiments, a first bumper may be coupled to a first bogie of the first segment, and a second bumper may be coupled to a second bogie of the second segment. The first bumper may contact the second bumper as the first railing segment moves from the open position toward the closed position, thereby driving the second railing segment to move toward the closed position. In addition, the connector may include a flexible connection between the first and second bogies, such as a cable or a chain. The flexible connection may drive movement of the second railing segment toward the open position in response to movement of the first railing segment from the closed position toward the open position. Furthermore, at least one connector may include another suitable connection device/assembly, such as a magnetic coupling assembly between bogies or a pivotal coupling between protrusions rigidly coupled to bodies of the bogies, among other suitable connectors. The connector, the first and second railing segments, or a combination thereof, is configured to substantially maintain the spacing between the first and second railing segments as the movable railing moves along the track (e.g., to substantially maintain the spacing between the barriers while the movable railing is in the open position, the closed position, and positions therebetween). As used herein, "substantially maintain" refers to a maximum variation in spacing of less than a threshold percentage of the longitudinal extent (e.g., extent along the direction of motion of the movable railing) of a respective railing segment (e.g., the first railing segment or the second railing segment). The threshold percentage may be 20 percent, 15 percent, 10 percent, 5 percent, 2 percent, or 1 percent. The spacing between the railing segments may be selected to facilitate rotation of one railing segment relative to an adjacent railing segment during movement of the movable railing along the track, and to establish a target spacing between barriers while the movable railing is in the closed position. The target spacing between the barriers may be selected to block access (e.g., movement of a person, movement of equipment, etc.) across the movable railing.

In the illustrated embodiment, each bogie 36 has multiple wheels 64 configured to facilitate movement of the bogie 36 along the track 20, and each wheel 64 is rotatably coupled to the body 62 of the bogie 36 (e.g., via a respective bearing). As illustrated, each wheel 64 has a contact surface 66 configured to engage an upwardly facing surface 68 of the track 20. Accordingly, the wheels 64 are configured to transfer a vertical load (e.g., weight) of the movable railing 16 to the track 20, and the track 20 is configured to support the vertical load (e.g., weight) of the movable railing 16. In addition, each wheel 64 is configured to rotate about a respective rotational axis 70 that is substantially perpendicular to the direction of motion 72 of the movable railing 16. In the illustrated embodiment, each bogie 36 includes four wheels 64. However, in other embodiments, at least one bogie may include more or fewer wheels (e.g., 0, 1, 2, 3, 5, 6, 7, 8, or more). For example, in certain embodiments, at least one bogie may include a pad configured to contact the upwardly facing surface of the track to transfer the vertical load of the movable railing to the track and to facilitate movement of the movable railing along the track.

In the illustrated embodiment, each bogie 36 includes end plates 74 positioned on opposite lateral sides of the track 20. The end plates 74 are configured to block lateral movement of the bogie (e.g., movement of the bogie along a lateral axis 76) relative to the track 20. In the illustrated embodiment, each end plate 74 is coupled to the body 62 of the bogie 36 by fasteners 78. However, in other embodiments, at least one end plate may be coupled to the body of at least one bogie by any other suitable type of connector/connection assembly (e.g., welded connection, adhesive connection, etc.), and/or at least one end plate may be integrally formed with the body of at least one bogie. Furthermore, in the illustrated embodiment, a pad 80 is disposed between each end plate 74 and a lateral side 82 of the track 20. Each pad 80 may be formed from a material that facilitates movement of the bogie 36 along the track 20 while the pad 80 contacts the respective lateral side 82 of the track. For example, at least one pad may be formed from ultra-high molecular weight (UHMW) polyethylene or any other suitable material. While a pad 80 is positioned between each end plate 74 and the respective lateral side 82 of the track 20 in the illustrated embodiment, in other embodiments, at least one pad may be omitted. In such embodiments, the end plate may directly contact the lateral side of the track to block lateral movement of the bogie relative to the track. Furthermore, in certain embodiments, one or more wheels may be positioned on at least one lateral side of at least one bogie, and each wheel may have a contact surface configured to contact the lateral side of the track. In such embodiments, each wheel may rotate about a vertical axis, block lateral movement of the bogie relative to the track, and facilitate movement of the bogie along the track.

In the illustrated embodiment, each end plate 74 has a lip 84 configured to contact a downwardly facing surface 86 of the track 20 to block upward movement of the respective bogie 36 along a vertical axis 88. Contact between the lip 84 and the downwardly facing surface 86 of the track may also block rotation of the movable railing 16 about the direction of motion 72. As a result, the movable railing 16 may support a significant lateral force (e.g., force along the lateral axis 76), such as a person leaning on the movable railing, etc. For example, each railing segment may be configured to support a lateral force (e.g., force along the lateral axis) applied to the top of the railing segment that is greater than a threshold lateral force. The threshold lateral force may be selected based on applicable safety standards (e.g., selected by the manufacturer of the ride, selected by the operator of the ride, selected by a government entity, etc.). For example, the threshold lateral force may be 50 pounds (e.g., 22.7 kgf), 100 pounds (e.g., 45.4 kgf), 150 pounds (e.g., 68.0 kgf), 200 pounds (e.g., 90.7 kgf), 250 pounds (e.g., 113.4 kgf), 300 pounds (e.g., 136.1 kgf), or any other suitable lateral force.

While lips 84 on the end plates 74 are used to block upward movement of the bogies 36 and rotation of the movable railing 16 in the illustrated embodiment, in other embodiments, at least one bogie may include another or an additional device/assembly configured to block upward movement of the bogie(s)/rotation of the movable railing. For example, in certain embodiments, at least one bogie may include at least one wheel positioned below the track and configured to rotate about a rotational axis substantially parallel to the lateral axis 76. In such embodiments, the contact surface of each wheel may be configured to contact the downwardly facing surface of the track to block upward movement of the bogie(s)/rotation of the movable railing and to facilitate movement of the movable railing along the track.

As discussed in detail below, a rod of each barrier 38 is pivotally coupled to a respective bogie 36, thereby facilitating rotation of the bogie 36 relative to the barrier 38. For example, a bushing may be disposed about the rod to facilitate rotation of the bogie relative to the barrier. The pivoting movement of each bogie enables the movable railing to follow a curved track. Furthermore, in the illustrated embodiment, the movable railing assembly 12 includes a single type of bogie 36. Accordingly, the bogies 36 of the movable railing assembly 12 are substantially the same as one another. For example, the first bogie 42 of the first railing segment 28 and the second bogie 44 of the second railing segment 30 face opposite directions along the direction of motion 72, thereby positioning the respective apertures for coupling to the connector 46. Because a single type of bogie is used within the movable railing assembly, the cost and complexity of the movable railing assembly may be reduced, as compared to a movable railing assembly that includes multiple types of bogies. However, in other embodiments, the movable railing assembly may include multiple types of bogies.

In certain embodiments, the track and the bogies may be positioned below the platform. In such embodiments, the rods of the barriers that are pivotally coupled to the bogies may extend through a slot in the platform. Accordingly, the platform may block at least a portion of dirt and/or debris from engaging the track, thereby facilitating movement of the movable railing. In certain embodiments, a deformable covering may be disposed within the slot (e.g., flexible finger, bristles, etc.) to further block dirt and/or debris from engaging the track while facilitating movement of the movable railing along the track.

Figure 5:
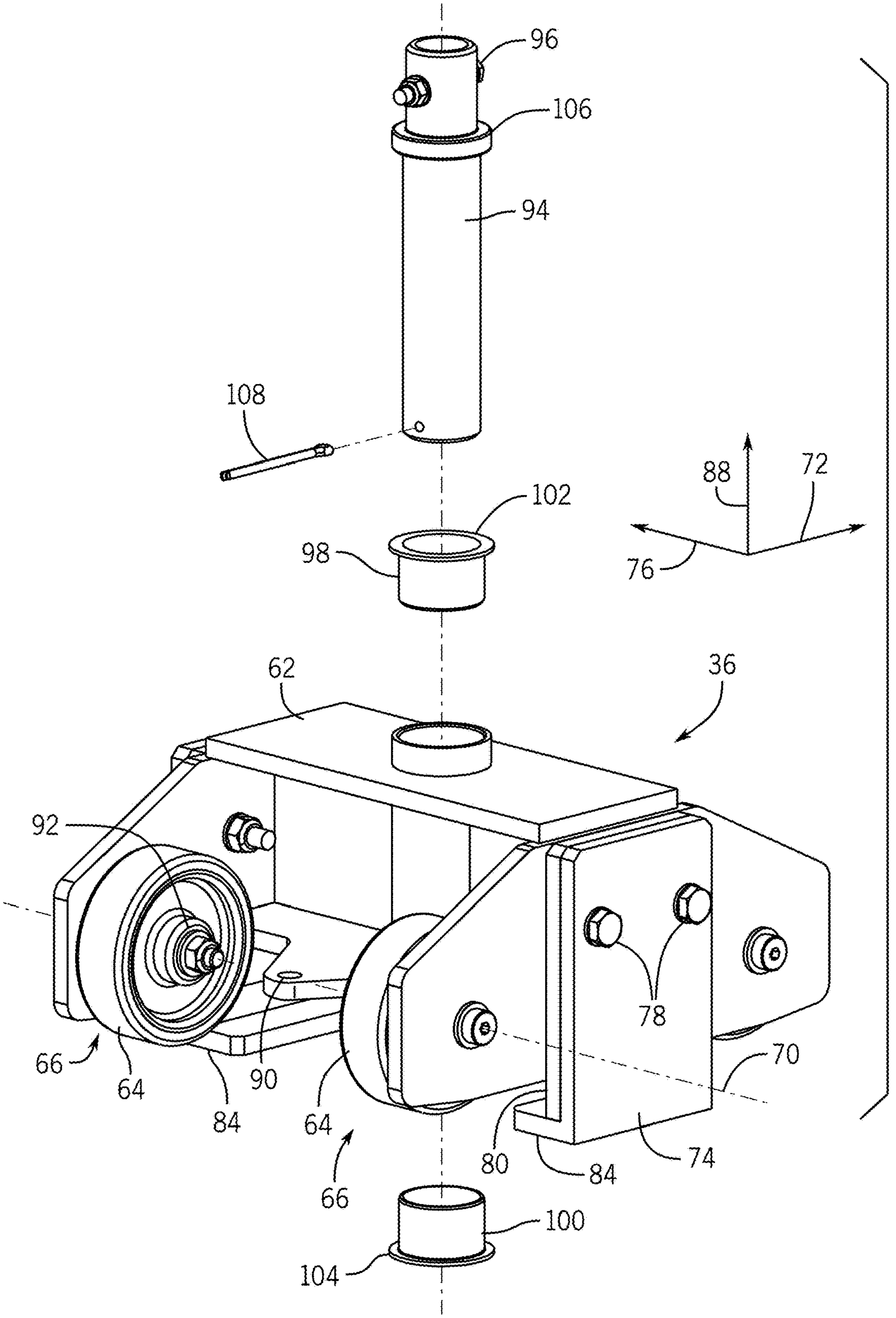
FIG. 5 is an exploded view of one of the bogies of FIG. 4.

FIG. 5 is an exploded view of one of the bogies 36 of FIG. 4 (e.g., one of the first bogies of the first railing segment, one of the second bogies of the second railing segment, etc.). In the illustrated embodiment, the body 62 of the bogie 36 includes an aperture 90 configured to receive a respective fastener or a pin. For example, as previously discussed, a fastener may extend through the aperture 90 of the bogie body 62 and the aperture of a bearing, which is disposed within an aperture of a mount, to pivotally couple the mount to the body 62 of the bogie 36. Furthermore, as discussed in detail below, a pin may extend through the aperture 90 of the bogie body 62. The pin is configured to selectively engage an aperture in the track while the movable railing is in the open position to block movement of the movable railing from the open position. In addition, the pin is configured to selectively engage an aperture in the track while the movable railing is in the closed position to block movement of the movable railing from the closed position.

Furthermore, in the illustrated embodiment, each wheel 64 is rotatably coupled to the body 62 of the bogie 36 by a respective bearing 92. The bearing 92 is configured to facilitate rotation of the wheel 64, thereby reducing the force sufficient to move the movable railing between the open and closed positions. While each wheel is rotatably coupled to the bogie body by a respective bearing in the illustrated embodiment, in other embodiments, at least one bearing may be omitted, and/or at least one wheel may be rotatably coupled to the bogie body by another suitable device/assembly (e.g., bushing, etc.).

As previously discussed, a rod 94 of the barrier is pivotally coupled to the bogie 36 to facilitate rotation of the bogie 36 about the vertical axis 88 relative to the barrier. In the illustrated embodiment, the rod 94 is configured to be non-rotatably coupled to another component of the barrier (e.g., another rod) via a fastener 96. In the illustrated embodiment, the fastener includes a bolt configured to extend through an aperture of the rod and an aperture of the other component of the barrier to non-rotatably couple the rod to the other component. However, in other embodiments, the fastener may include any other suitable device/assembly (e.g., cotter pin, rivet, etc.) configured to couple the rod to the other barrier component. Furthermore, in certain embodiments, the rod may be coupled to the other component of the barrier by another suitable connection (e.g., welded connection, adhesive connection, etc.), or the rod may be integrally formed with the other component of the barrier.

In the illustrated embodiment, the rod 94 is pivotally coupled to the body 62 of the bogie 36 via a first bushing 98 and a second bushing 100. While the rod is pivotally coupled to the bogie body via two bushings in the illustrated embodiment, in other embodiments, the rod may be coupled to the bogie body via more or fewer bushings (e.g., 0, 1, 3, 4, 5, 6, or more) and/or other suitable component(s) (e.g., bearing(s), etc.). In the illustrated embodiment, the first bushing 98 has a lip 102, the second bushing 100 has a lip 104, and the rod 94 has a lip 106. The lip of each bushing is configured to block movement of the bushing toward the bogie body along the vertical axis 88 (e.g., via contact with the body 62 of the bogie 36). In addition, the lip 106 of the rod 94 is configured to block movement of the rod 94 toward the bogie body 62 along the vertical axis 88 (e.g., via contact with the lip 102 of the first bushing 98). Accordingly, the weight of the barrier is transferred to the bogie via the lip of the rod and the lip of the first bushing. Furthermore, a fastener 108 (e.g., cotter pin, bolt, etc.) is configured to extend through an aperture in the rod 94 to block movement of the rod 94 away from the bogie body 62 along the vertical axis 88. In the illustrated embodiment, the lip 104 of the second bushing 100 is configured to block upward movement of the fastener 108, thereby blocking movement of the rod 94 away from the bogie body 62 along the vertical axis 88.

In certain embodiments, a washer may be disposed between the lip of the second bushing and the fastener 108 to facilitate rotation of the rod relative to the bogie body. Furthermore, in certain embodiments, at least one bushing may be non-rotatably coupled to the bogie body (e.g., by fastener(s), an adhesive connection, a welded connection, etc.). In certain embodiments, the lip of at least one bushing may be omitted, and/or the lip of the rod may be omitted. For example, in certain embodiments, the lip of the rod may be omitted and replaced with a fastener configured to contact the first bushing. In such embodiments, the rod may include an alternative lip configured to be positioned beneath the body of the bogie, in which the second bushing is configured to block upward movement of the alternative lip, thereby blocking movement of the rod away from the bogie body along the vertical axis. Furthermore, in certain embodiments, the rod may be non-translatably and pivotally coupled to the body of the bogie by another suitable connection assembly.

FIG. 6 is a perspective view of a bogie 36 and the track 20, in which movement of the bogie 36 along the track 20 is blocked by a pin 110 engaged with the bogie 36 and the track 20. As illustrated, the movable railing 16 is in the closed position to block movement of the passengers beyond the end of the platform 10. With the movable railing 16 in the closed position, the aperture 90 in the body 62 of a bogie 112 of the first railing segment 28 is aligned with a corresponding aperture 114 (e.g., second aperture) in the track 20. Accordingly, the pin 110 may be disposed through the aperture 90 in the body 62 of the bogie 112 of the first railing segment 28 and through the aperture 114 in the track 20 to block movement of the movable railing 16 from the closed position. Furthermore, in certain embodiments, another aperture (e.g., first aperture) may be formed within the track. The aperture in the body of the bogie of the first railing segment may be aligned with the other aperture in the track while the movable railing is in the open position. The pin or another pin may be disposed through the aperture in the body of the bogie of the first railing segment and through the other aperture in the track to block movement of the movable railing from the open position. In certain embodiments, the head of the pin is colored (e.g., red, yellow, etc.) to facilitate visual identification of the position of the pin (e.g., whether the pin is engaged with an aperture). For example, the colored head of the pin may be visible while the pin is not engaged with an aperture and hidden by the body of the bogie while the pin is engaged with an aperture. Furthermore, in certain embodiments, the pin may be movably coupled to the body of the bogie to block removal of the pin from the bogie body aperture. In other embodiments, the pin may be removable from the bogie body.

While the pin 110 is configured to extend through the aperture 90 in the body 62 of the bogie 112 of the first railing segment 28 in the illustrated embodiment, in other embodiments, the pin may be configured to extend though another suitable opening. For example, in certain embodiments, the bogie of the first railing segment may have another suitable aperture/opening configured to receive the pin while the pin is engaged with an aperture in the track. Furthermore, in certain embodiments, another suitable bogie or another suitable element of the movable railing may include an aperture/opening configured to receive the pin while the pin is engaged with an aperture in the track. In certain embodiments, the pin may extend through a first aperture/opening of the movable railing while the pin is engaged with the one aperture in the track, and the pin may extend through a second aperture/opening of the movable railing, different from the first aperture/opening, while the pin is engaged with another aperture in the track. Furthermore, in certain embodiments, the movable railing assembly may include a first pin configured to engage one aperture in the track and a second pin configured to engage another aperture in the track, in which each pin is engaged with a respective suitable aperture/opening in the movable railing while engaged with the respective aperture in the track. While two track apertures are disclosed above, in certain embodiments, the track may include any suitable number of apertures for blocking movement of the movable railing in multiple positions.

In the illustrated embodiment, the pin is configured to be manually engaged with the aperture(s) in the track while the movable railing is in the open position and/or the closed position to block movement of the movable railing. However, in other embodiments, the pin may be urged to engage the track aperture(s) by a biasing element, such as a spring or piece of resilient material, extending from the bogie body to the pin. In such embodiments, the pin may automatically engage each aperture in the track in response to alignment of the pin with the aperture. In certain embodiments, a ramp may extend along the track toward a respective aperture to guide the pin into the respective aperture. Furthermore, in certain embodiments, the pin may be biased away from the track aperture(s) by a biasing element, such as a spring or piece of resilient material, extending from the bogie body to the pin. In such embodiments, a driving element (e.g., ramp, etc.) coupled to the track may contact the pin to drive the pin into engagement with the respective aperture as the pin approaches/reaches the respective aperture.

Furthermore, in certain embodiments, the movable railing assembly may include an actuator configured to selectively drive the pin to engage at least one aperture in the track. For example, a linear actuator, a pneumatic actuator (e.g., pneumatic cylinder), a hydraulic actuator (e.g., hydraulic cylinder), a solenoid, or any other suitable actuator may be coupled to the bogie body and configured to selectively drive the pin into at least one aperture in the track. In certain embodiments, the actuator may be manually controlled by the operator (e.g., via a switch or button). Furthermore, in certain embodiments, the actuator may be controlled by a controller communicatively coupled to the actuator. The controller may be configured to instruct the actuator to drive the pin into engagement with a track aperture in response to receiving a signal indicating that the movable railing is in a target position (e.g., the open position or the closed position).

In the illustrated embodiment, the movable railing assembly 12 includes at least one sensor 116 configured to output a signal indicative of a position of the movable railing 16. In certain embodiments, the sensor(s) 116 may output a first signal indicating that the movable railing 16 is in the open position and/or a second signal indicating that the movable railing 16 is in the closed position. Furthermore, in certain embodiments, the sensor(s) 116 may output signal(s) indicative of a position of the movable railing 16 along the track 20. The sensor(s) may include any suitable device(s) configured to monitor the position of the movable railing. For example, each sensor may include a contact switch, a magnetic switch, an inductive sensor, a capacitive sensor, an infrared sensor, an optical sensor (e.g., camera), another suitable sensing device, or a combination thereof. In certain embodiments, the movable railing assembly may include a first sensor (e.g., first contact switch, etc.) and a second sensor (e.g., second contact switch, etc.). The first sensor may be configured to output a signal indicative of presence of the movable railing in the open position (e.g., in response to contact between the movable railing and the first contact switch), and the second sensor may be configured to output a signal indicative of presence of the movable railing in the closed position (e.g., in response to contact between the movable railing and the second contact switch). Furthermore, in certain embodiments, the movable railing assembly may include multiple sensors (e.g., inductive sensors, etc.) disposed along the movable railing and configured to output respective signals indicative of presence of the movable railing at the respective senor(s).

In certain embodiments, the sensor(s) 116 are communicatively coupled to a user interface (e.g., via a controller), and the user interface is configured to indicate (e.g., via a screen, via a speaker, via one or more discrete lights, etc.) the position of the movable railing, thereby enabling the operator to determine the position of the movable railing (e.g., while positioned remote from the movable railing). Furthermore, in certain embodiments, the sensor(s) may be communicatively coupled to a controller (e.g., having a memory and a processor), which may be communicatively coupled to the actuator, as disclosed above. The controller may receive signal(s) from the sensor(s) indicative of the position of the movable railing (e.g., the movable railing being positioned in the open position or the closed position). In certain embodiments (e.g., in which the controller is communicatively coupled to the actuator), in response to receiving a signal indicative of the movable railing being positioned in the closed position, the controller may instruct the actuator to drive the pin into engagement with the respective aperture in the track, and/or in response to receiving a signal indicative of the movable railing being positioned in the open position, the controller may instruct the actuator to drive the pin into engagement with the respective aperture in the track. Furthermore, in certain embodiments, the controller may terminate operation of the ride and/or output a signal indicative of termination of the ride (e.g., to a ride controller) in response to feedback from the sensor(s) indicative of the movable railing not being in the open position.

In certain embodiments, the movable railing assembly may include one or more sensors configured to output signal(s) indicative of the position of the pin relative to the respective aperture in the track. For example, the sensor(s) may output a first signal indicating the pin is engaged with a first aperture in the track, and/or the sensor(s) may output a second signal indicating the pin is engaged with a second aperture in the track. The sensor(s) may include any suitable device(s) configured to monitor the position of the pin. For example, each sensor may include a contact switch, a magnetic switch, an inductive sensor, a capacitive sensor, an infrared sensor, an optical sensor (e.g., camera), a linear variable differential transformer, another suitable sensing device, or a combination thereof. A user interface communicatively coupled to the sensor(s) (e.g., via a controller) may indicate the position of the pin, thereby informing the operator of whether the pin is engaged with the first aperture or the second aperture in the track.

To facilitate movement of the movable railing 16 from the closed position to the open position or from the open position to the closed position, the pin may be disengaged from the respective aperture in the track 20. For example, in the illustrated embodiment, the pin may be manually disengaged from the respective aperture by the operator before the operator moves the movable railing to the opposite position. Furthermore, in certain embodiments, the actuator may drive the pin to disengage the respective aperture in the track (e.g., in response to a control signal from the controller).

In certain embodiments, one or more track apertures disclosed above may be omitted from the track. In such embodiments, the movable railing assembly may include one or more other suitable devices/assemblies configured to block movement of the movable railing while the movable railing is in the open position and/or the closed position. Furthermore, the movable railing assembly may include one or more other suitable devices/assemblies configured to block movement of the movable railing while the movable railing is in the open position and/or the closed position in addition to the pin/track aperture system. In certain embodiments, the movable railing assembly may include one or more latches (e.g., trap key(s), etc.) configured to block movement of the movable railing while the movable railing is in the open position and/or the closed position. Each latch may engage automatically in response to the movable railing reaching the respective position. Furthermore, in certain embodiments, the movable railing assembly may include cable(s) and/or chain(s) configured to selectively couple the movable railing to a fixed railing segment of the movable railing assembly while the movable railing is in the open position and/or the closed position to block movement of the movable railing. In certain embodiments, the movable railing assembly may include one or more retractable pins configured to selectively extend from the track. In such embodiments, each pin may be driven between the retracted position and the extended position by a respective actuator, and a controller may instruct each actuator to extend the respective pin in response to alignment of the pin with a respective aperture/opening in the movable railing (e.g., while the movable railing is in the open position or the closed position). In certain embodiments, one or more devices/assemblies configured to block movement of the movable railing may only be disengaged (e.g., to enable movement of the movable railing) with a key. Furthermore, in certain embodiments, one or more devices/assemblies configured to block movement of the movable railing may be disengaged without a key.

FIG. 7 is a perspective view of an embodiment of a rotating platform 118 and an embodiment of a movable railing assembly 119 configured to selectively extend around a periphery 120 of the rotating platform 118. The movable railing assembly 119 may include the same components as the movable railing assembly 12 disclosed above with reference to FIGS. 1-6 (e.g., a track, multiple railing segments, connector(s) between railing segments, etc.), and the movable railing assembly 119 may include any of the variations disclosed above with reference to the movable railing assembly 12 of FIGS. 1-6. In the illustrated embodiment, the rotating platform 118 is configured to rotate in a direction 122. In certain embodiments, passengers may enter the rotating platform 118 (e.g., via a bridge) to access cars, which are coupled to the rotating platform 118. A track may extend to the rotating platform 118, around the rotating platform 118, and away from the rotating platform 118, and the cars may move along the track. Each car may move toward the rotating platform along the track and couple to the rotating platform as the car reaches the rotating platform. Rotation of the rotating platform may drive the car along the portion of the track extending around the rotating platform, thereby enabling passenger(s) standing on the rotating platform to enter the car. The car then disengages the rotating platform as the car reaches the portion of the track extending away from the rotating platform.

While the ride is not in operation, the movable railing 16 may be used to block the periphery 120 of the rotating platform 118, thereby blocking passenger(s) and operator(s) from moving beyond the periphery of the rotating platform. During operation of the ride, the movable railing 16 may be stored in a storage area. The storage area may include a movable railing track, and the one or more bogies of each railing segment may engage the movable railing track to facilitate movement of the respective railing segment along the track. In addition, the movable railing track may extend around the rotating platform (e.g., radially inward from the car track). In response to termination of operation of the ride, the movable railing may be coupled to the rotating platform, and rotation of the rotating platform my drive the movable railing to transition from an open position in the storage area to the illustrated closed position, in which the movable railing extends around the periphery of the rotating platform. To transition the movable railing from the illustrated closed position to the open position, in which the movable railing is disposed within the storage area, a last railing segment of the movable railing may be moved from the portion of the movable railing track extending around the rotating platform to the portion of the movable railing track within the storage area. The rotating platform may then be driven to rotate in an opposite direction (e.g., relative to the rotation direction 122). As a result, rotation of the rotating platform may drive the movable railing to transition from the illustrated closed position to the open position.

In the illustrated embodiment, the first railing segment 28 includes a first engagement feature 124 configured to selectively engage a second engagement feature 126 of the rotating platform 118. In response to engagement of the first and second engagement features, rotation of the rotating platform 118 (e.g., in the rotation direction 122) may drive the movable railing 16 to extend about the periphery 120 of the rotating platform 118. For example, in response to termination of operation of the ride, the rotation of the rotating platform may be stopped. The second engagement feature 126 of the rotating platform 118 may be aligned with the first engagement feature 124 of the first railing segment 28 (e.g., by rotating the rotating platform 118). The first and second engagement features may be engaged with one another, thereby coupling the movable railing 16 to the rotating platform 118. Rotation of the rotating platform 118 may then drive the movable railing 16 to transition from the open position, in which the movable railing 16 is disposed within the storage area, to the illustrated closed position, in which the movable railing 16 extends about the periphery 120 of the rotating platform 118. Rotation of the rotating platform may then be stopped. In certain embodiments, to transition the movable railing 16 from the illustrated closed position to the open position, a last railing segment of the movable railing may be moved from the portion of the movable railing track extending around the rotating platform to the portion of the movable railing track within the storage area. The rotating platform 118 may then be rotated in an opposite rotational direction. As a result, rotation of the rotating platform may drive the movable railing 16 to transition from the closed position to the open position. Once a substantial portion of the movable railing is in the storage area, rotation of the rotating platform may be stopped, the first and second engagement features may be disengaged, and the remainder of the movable railing may be moved to the storage area.

The first and second engagement features may be any suitable devices configured to selectively couple the movable railing to the rotating platform. For example, in certain embodiments, the first engagement feature or the second engagement feature may include a latch, and the other engagement feature may include a pin (e.g., a rod of the barrier of the first segment) configured to engage the latch. Furthermore, in certain embodiments, the first and second engagement features may include one or more magnets, one or more pins, one or more receptacles, one or more latches, one or more cables, one or more chains, one or more other suitable connection devices/assemblies, or a combination thereof. In certain embodiments, the first and second engagement features may automatically couple to one another in response to contact between the first and second engagement features. Furthermore, in certain embodiments, the first and second engagement features may be manually engaged.

While the illustrated movable railing extends about the entire periphery of the rotating platform while the movable railing is in the closed position, in other embodiments, the movable railing may extend about a portion of the periphery of the rotating platform while the movable railing is in the closed position. In addition, while the rotating platform is circular in the illustrated embodiment, in other embodiments, the rotating platform may have any other suitable shape, such as elliptical, polygonal, etc. Furthermore, while rotation of the rotating platform is configured to drive the movable railing between the open and closed positions in the illustrated embodiment, in other embodiments, the movable railing may be manually moved from the open position to the closed position and/or from the closed position to the open position. In certain embodiments, the movable railing may be driven to move from the open position to the closed position and/or from the closed position to the open position by a motive device/system separate from the rotating platform, such as via one or more of the motive devices/systems disclosed above with reference to FIGS. 1-3.

In certain embodiments, at least one railing segment may include a collapsible barrier configured to reduce the length of the movable railing while the movable railing is in the open (e.g., storage) position. For example, in certain embodiments, at least one railing segment may include a barrier and two bogies pivotally coupled to the barrier. The barrier may include at least one hinge positioned between the two bogies. The hinge(s) enable the barrier to fold, thereby enabling the two bogies to move toward one another. Accordingly, with the barrier in the folded position, the length of the movable railing is reduced, thereby reducing the length of the track sufficient to support the movable railing while the movable railing is in the open/storage position. In certain embodiments, the railing segment includes a biasing element configured to urge the barrier toward the folded position, thereby facilitating the transition of the movable railing from the expanded configuration (e.g., while the movable railing is in the closed position) to the collapsed configuration (e.g., while the movable railing is in the open position). The biasing element may include any suitable device(s) configured to urge the barrier to the folded position (e.g., spring(s), resilient element(s), pneumatic cylinder(s), hydraulic cylinder(s), etc.). Furthermore, in certain embodiments, the railing segment may include a locking mechanism configured to secure the barrier in the expanded position (e.g., while the movable railing is in the closed position). The locking mechanism may include any suitable device(s) configured to secure the barrier in the expanded position (e.g., one or more latches, one or more pins, one or more clips, etc.).

By way of example, while the movable railing is in the open position, the barrier(s) of one or more railing segments may be folded to reduce the length of the movable railing. The first railing segment may be moved toward the closed position, thereby driving the rest of the movable railing toward the closed position. The operator or an automatic system may transition each barrier in the folded position to the expanded position as the movable railing moves from the open position to the closed position. For example, the operator may manually unfold each folded barrier and then engage the respective locking mechanism to secure the barrier in the expanded position as the movable railing moves from the open position to the closed position. In certain embodiments, structure(s) of the movable railing assembly (e.g., a ramp, etc.) may drive each folded barrier to the expanded position in response to contact with the structure(s) as the movable railing moves from the open position to the closed position. Furthermore, in certain embodiments, the locking mechanism may automatically engage in response to expansion of the barrier.

In addition, to transition the movable railing from the closed position to the open position, the first railing segment may be moved toward the closed position, thereby moving the movable railing toward the closed position. The operator or an automatic system may disengage each locking mechanism (e.g., as the movable railing moves past the operator/automatic system or after the movable railing is moved to the closed position). Once the locking mechanism(s) are disengaged, the respective biasing element(s) may drive the respective barrier(s) to the folded position. In certain embodiments, feature(s) of the movable railing assembly (e.g., protrusion(s), rod(s), etc.) may contact each locking mechanism as the respective collapsible barrier passes the feature(s), thereby driving the locking mechanism to the disengaged position.

In certain embodiments, the biasing element of at least one collapsible barrier may be omitted (e.g., and the collapsible barrier may be transitioned to the folded position manually). Furthermore, in certain embodiments, at least one collapsible barrier may include an actuator configured to drive the collapsible barrier from the folded position to the expanded position and/or from the expanded position to the folded position. The actuator may include any suitable device(s) configured to control the position of the barrier, such as a linear actuator, a hydraulic cylinder, a pneumatic cylinder, another suitable device, or a combination thereof. In embodiments in which the collapsible barrier includes an actuator, the biasing element and/or the locking mechanism may be omitted.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A movable railing assembly, comprising:

a first railing segment comprising two first bogies and a first barrier coupled to the two first bogies, wherein the two first bogies are configured to engage a track positioned below the first barrier and to facilitate movement of the first railing segment along the track, the two first bogies are positioned at opposite longitudinal ends of the first railing segment, and the first barrier is configured to block access across the first railing segment;

a second railing segment comprising two second bogies and a second barrier coupled to the two second bogies, wherein the two second bogies are configured to engage the track and to facilitate movement of the second railing segment along the track, the two second bogies are positioned at opposite longitudinal ends of the second railing segment, and the second barrier is configured to block access across the second railing segment; and a connector coupling the first railing segment to the second railing segment, wherein the connector comprises a connector rod pivotally coupled to a connecting bogie of the two first bogies and to a connecting bogie of the two second bogies, wherein the connector is configured to drive movement of the second railing segment along the track in response to movement of the first railing segment along the track, and wherein the connector, the first and second railing segments, or a combination thereof, is configured to substantially maintain a spacing between the first and second railing segments as the first and second railing segments move along the track.

2. The movable railing assembly of claim 1, wherein at least one of the two first bogies or at least one of the two second bogies comprises:

a plurality of wheels, wherein each wheel of the plurality of wheels has a contact surface configured to engage an upward facing surface of the track; and opposing end plates configured to be positioned on opposite lateral sides of the track.

3. The movable railing assembly of claim 1, comprising a pin extending through an aperture within one of the two first bogies, wherein the pin is configured to selectively engage a first aperture in the track to block movement of the first and second railing segments along the track while the first and second railing segments are in a closed position, and the pin is configured to selectively engage a second aperture in the track to block movement of the first and second railing segments along the track while the first and second railing segments are in an open position.

4. The movable railing assembly of claim 1, comprising a sensor configured to output a signal indicative of a position of the first railing segment.

5. The movable railing assembly of claim 1, comprising:

a third railing segment comprising two third bogies and a third barrier coupled to the two third bogies, wherein the two third bogies are configured to engage the track and to facilitate movement of the third railing segment along the track, and the third barrier is configured to block access across the third railing segment; and a second connector coupling the third railing segment to the second railing segment, wherein the second connector is configured to drive movement of the third railing segment along the track in response to movement of the second railing segment along the track.

6. The movable railing assembly of claim 1, wherein the connecting bogie of the two first bogies is pivotally coupled to the first barrier at a rod of the first barrier, and the connecting bogie of the two second bogies is pivotally coupled to the second barrier at a rod of the second barrier.

7. The movable railing assembly of claim 6, wherein the connector rod is pivotally coupled to the connecting bogie of the two first bogies by a first connection assembly separate from the rod of the first barrier, and the connector rod is pivotally coupled to the connecting bogie of the two second bogies by a second connection assembly separate from the rod of the second barrier.

8. A movable railing assembly, comprising:

a track;

a movable railing configured to move along the track, wherein the movable railing comprises:

a first railing segment comprising two first bogies and a first barrier coupled to the two first bogies, wherein the two first bogies are engaged with the track to facilitate movement of the first railing segment along the track, the two first bogies are positioned at opposite longitudinal ends of the first railing segment, the first barrier is positioned above the track, and the first barrier is configured to block access across the first railing segment;

a second railing segment comprising two second bogies and a second barrier coupled to the two second bogies, wherein the two second bogies are engaged with the track to facilitate movement of the second railing segment along the track, the two second bogies are positioned at opposite longitudinal ends of the second railing segment, the second barrier is positioned above the track, and the second barrier is configured to block access across the second railing segment; and a connector coupling the first railing segment to the second railing segment, wherein the connector comprises a connector rod pivotally coupled to a connecting bogie of the two first bogies and to a connecting bogie of the two second bogies, wherein the connector is configured to drive movement of the second railing segment along the track in response to movement of the first railing segment along the track, and wherein the connector, the first and second railing segments, or a combination thereof, is configured to substantially maintain a spacing between the first and second railing segments as the movable railing moves along the track.

9. The movable railing assembly of claim 8, wherein the connecting bogie of the two first bogies is pivotally coupled to the first barrier at a rod of the first barrier, and the connecting bogie of the two second bogies is pivotally coupled to the second barrier at a rod of the second barrier.

10. The movable railing assembly of claim 9, wherein the connector rod is pivotally coupled to the connecting bogie of the two first bogies by a first connection assembly separate from the rod of the first barrier, and the connector rod is pivotally coupled to the connecting bogie of the two second bogies by a second connection assembly separate from the rod of the second barrier.

11. The movable railing assembly of claim 8, comprising an anchor point positioned proximate to the track, wherein the anchor point is configured to couple to a line extending from an operator of the movable railing assembly.

12. The movable railing assembly of claim 8, wherein the first railing segment comprises a first engagement feature configured to selectively engage a second engagement feature of a rotating platform to enable the rotating platform to move the movable railing about at least a portion of a periphery of the rotating platform in response to rotation of the platform.

13. A movable railing assembly, comprising:

a curved track having a first portion and a second portion, wherein the first portion is configured to be oriented substantially parallel to a direction of travel of a vehicle, and the second portion is configured to be oriented substantially perpendicular to the direction of travel of the vehicle;

a movable railing configured to move along the curved track between a first position and a second position, wherein the movable railing is positioned at the first portion of the curved track while in the first position and at the second portion of the curved track while in the second position, and the movable railing comprises:

a first railing segment comprising two first bogies and a first barrier coupled to the two first bogies, wherein the two first bogies are engaged with the curved track to facilitate movement of the first railing segment along the curved track, the two first bogies are positioned at opposite longitudinal ends of the first railing segment, the first barrier is positioned above the curved track, and the first barrier is configured to block access across the first railing segment while the movable railing is in the second position;

a second railing segment comprising two second bogies and a second barrier coupled to the two second bogies, wherein the two second bogies are engaged with the curved track to facilitate movement of the second railing segment along the curved track, the two second bogies are positioned at opposite longitudinal ends of the second railing segment, the second barrier is positioned above the curved track, and the second barrier is configured to block access across the second railing segment while the movable railing is in the second position; and a connector coupling the first railing segment to the second railing segment, wherein the connector comprises a connector rod pivotally coupled to a connecting bogie of the two first bogies and to a connecting bogie of the two second bogies, wherein the connector is configured to drive movement of the second railing segment along the curved track in response to movement of the first railing segment along the curved track, and wherein the connector, the first and second railing segments, or a combination thereof, is configured to substantially maintain a spacing between the first and second railing segments as the movable railing moves along the track between the first position and the second position.

14. The movable railing assembly of claim 13, comprising a pin extending through an aperture within one of the two first bogies, wherein the pin is configured to selectively engage a first aperture in the curved track while the movable railing is in the first position to block movement of the movable railing, and the pin is configured to selectively engage a second aperture in the curved track while the movable railing is in the second position to block movement of the movable railing.

15. The movable railing assembly of claim 13, wherein at least one of the two first bogies or at least one of the two second bogies comprises:

a plurality of wheels, wherein each wheel of the plurality of wheels has a downward facing contact surface; and opposing end plates positioned on opposite lateral sides of the curved track.

16. The movable railing assembly of claim 13, comprising a fixed railing segment configured to be positioned adjacent to the first railing segment of the movable railing while the movable railing is in the second position.

17. The movable railing assembly of claim 13, comprising an anchor point positioned proximate to the curved track, wherein the anchor point is configured to couple to a line extending from an operator of the movable railing assembly.

18. The movable railing assembly of claim 13, wherein the connecting bogie of the two first bogies is pivotally coupled to the first barrier at a rod of the first barrier, and the connecting bogie of the two second bogies is pivotally coupled to the second barrier at a rod of the second barrier.

19. The movable railing assembly of claim 18, wherein the connector rod is pivotally coupled to the connecting bogie of the two first bogies by a first connection assembly separate from the rod of the first barrier, and the connector rod is pivotally coupled to the connecting bogie of the two second bogies by a second connection assembly separate from the rod of the second barrier.

* * * * *